United States Patent Office 3,493,089
Patented Feb. 3, 1970

3,493,089
OVERLOAD RELEASED POSITIVE CLUTCHES
Bernard J. Haskins, Alvaston, Derby, England, assignor Rolls-Royce Limited, Derby, England, a British company
Filed Jan. 15, 1968, Ser. No. 697,940
Claims priority, application Great Britain, Feb. 21, 1967, 8,202/67
Int. Cl. F16d *21/02, 43/20;* F02g *3/00*
U.S. Cl. 192—48.8                                    2 Claims

ABSTRACT OF THE DISCLOSURE

The invention comprises a clutch device having relatively rotatable and relatively axially movable driving and driven members which are coaxial and urged into driving engagement by resilient means, the arrangement being such that a predetermined amount of torque on the driven member causes relative rotation of the members, which rotation causes one of the members to move axially against the resilient means out of driving engagement.

This invention relates to clutch devices particularly, but not exclusively, for use in the fuel control system of an aircraft-type gas turbine engine.

It is an object of the present invention to provide a clutch device suitable to be interposed between a pilot's throttle lever and a gas turbine engine fuel control system incorporating a normal fuel control unit and an emergency fuel control unit, so that under normal conditions movement of the throttle lever is transmitted to both control units, but in the event of either of the units becoming jammed the throttle lever is disconnected from the jammed unit only.

According to the present invention, therefore, a clutch device comprises a driving shaft, a disc coaxially secured to the driving shaft, first and second driven members which are axially aligned with, and relatively rotatable and relatively axially movable with respect to, the disc, and first and second Belleville washers respectively arranged to urge the first and second driven members into contact with oppositely disposed surfaces of the disc, the contacting surfaces of the driven members and the disc being provided with a plurality of projections which are shaped to permit driving engagement between each driven member and the disc and to cause relative axial movement between either one of the driven members and the disc when the torque on that one of the driven members exceeds a predetermined amount, said axial movement being sufficient to turn the respective Belleville washer insideout so as to hold that one of the driven members out of driving engagement with the disc.

Preferably, the driving members each comprise a disc which is axially slidable, and rotatably mounted, on the driving shaft.

Figure 1:
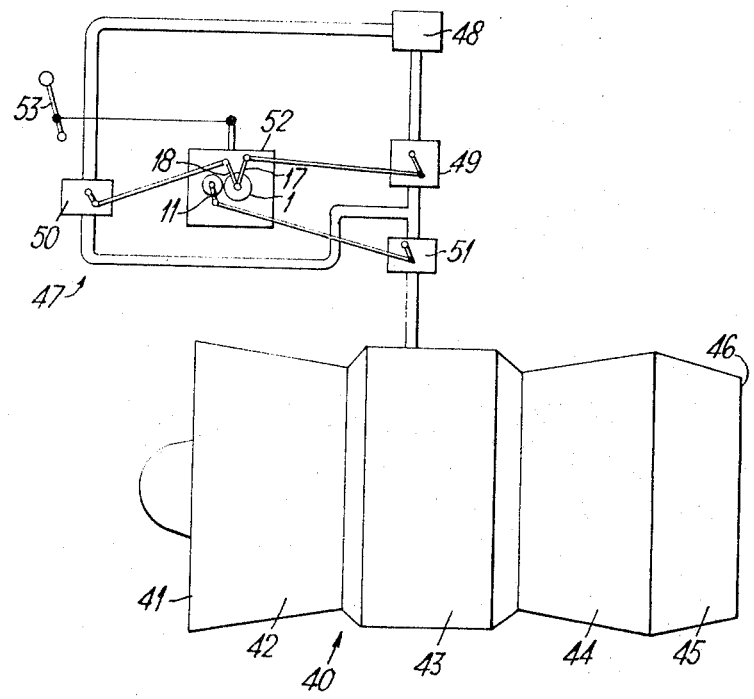
Figure 2:
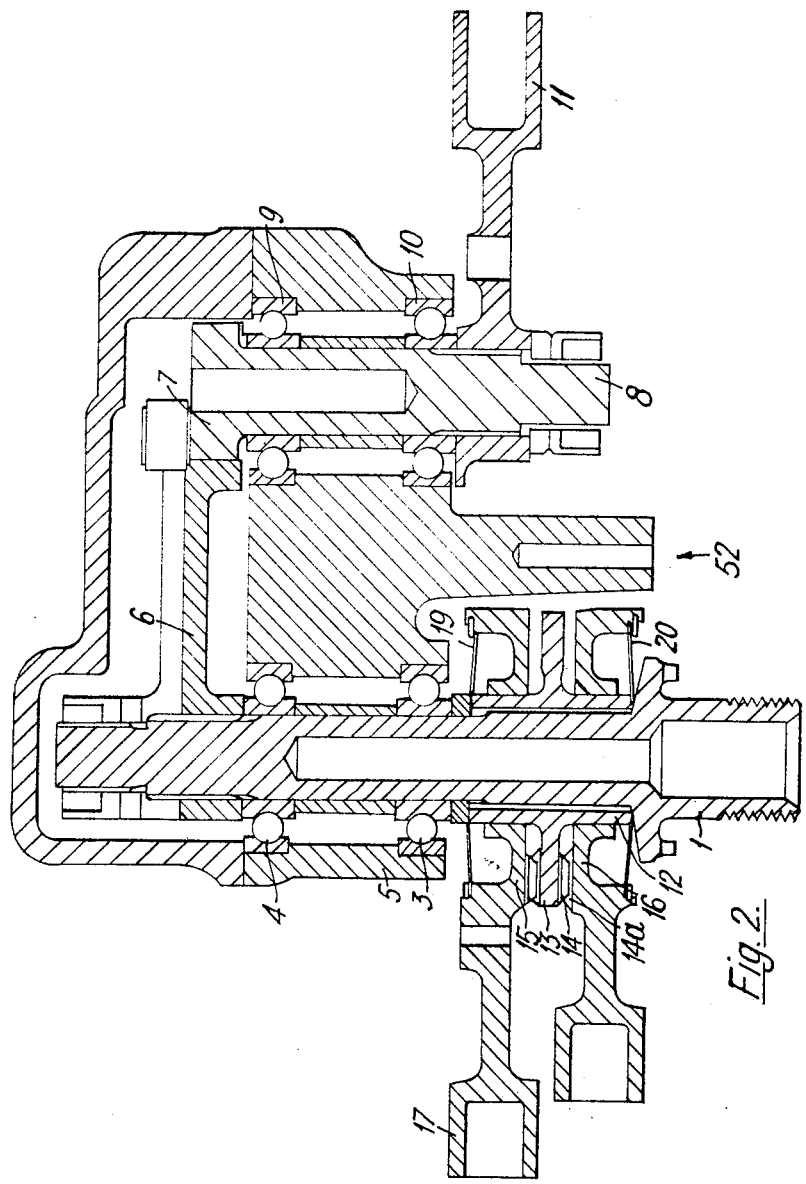

An embodiment of the invention will now be described by way of example with reference to the accompanying drawings, in which:

FIGURE 1 is a diagrammatic representation of an aircraft-type gas turbine engine having a combined throttle, shut-off cock and emergency fuel control unit cambox which incorporates a clutch device in accordance with the invention; and FIGURE 2 is a cross-sectional view of the combined throttle, shut off cock and emergency fuel control unit cambox shown in FIGURE 1.

The object of the cambox is to transmit movements of the throttle lever in the cockpit of the aircraft to the normal fuel supply unit and simultaneously operate an emergency fuel supply unit and a fuel shut-off cock.

In FIGURE 1 there is shown an aircraft-type gas turbine engine 40 comprising, in flow series, an intake 41, a compressor section 42, combustion equipment 43, a turbine section 44 and a jet pipe 45 terminating in a propulsion nozzle 46.

The engine 40 is provided with a fuel supply system 47 comprising a fuel tank 48 connected, by means of a normal fuel control unit 49 and an emergency fuel control unit 50 arranged in parallel, to a fuel supply shut-off cock 51 which is in turn connected to the combustion equipment 43. The fuel supply system 47 is provided with a combined throttle, shut-off cock and emergency fuel control unit cambox 52 which has an input shaft 1 adapted to be connected by suitable means to, and adapted to be rotated by, a throttle lever 53 in the cockpit of the aircraft and three output levers 11, 17, 18 adapted to be connected by suitable connecting rods to the shut-off cock 51, the normal fuel supply control unit 49 and the emergency fuel supply control unit 50 respectively.

Turning to FIGURE 2, the shaft 1 of the cambox 52 is mounted in bearings 3 and 4 in a housing 5 and drivingly connected by means of a cam 6 and a gear wheel 7 to a second parallel shaft 8 mounted in bearings 9 and 10 in the housing 5, the gear wheel 7 being formed on the end of the shaft 8. The lever 11 is secured to the opposite end of the shaft 8. Splined to the shaft 1 is a sleeve 12 on which is formed a disc 13 having three projections 14 on each side. One of the projections 14 is visible in the figure. Rotatably mounted on the sleeve 12 are two further discs 15 and 16, one disc being arranged on each side of the disc 13. The levers 17 and 18 are formed on the periphery of the discs 15 and 16 respectively.

Formed on the faces of the discs 15 and 16 which are adjacent to the disc 13 are further projections 14a having a similar shape to the projections 14.

Both discs 15 and 16 are axially slidable on the sleeve 12 and are urged into contact with the disc 13 by Belleville type washers 19 and 20. The inner periphery of each Belleville washer is located in a slot formed in the sleeve 12 and the outer periphery of each washer is located in a slot formed in one of the discs 17 or 18.

Thus when the shaft 1 is rotated the sleeve 12 and the disc 13 rotate and the projections 14 contact the projections 14a to rotate the discs 15 and 16. If a fault occurs in the normal fuel supply unit 49 which causes the connecting rod attached to the lever 17 to seize and thus prevent rotation of the disc 15, rotation of the disc 13 causes the projections 14a on the disc 15 to ride up over the projections 14 on the disc 13 thus moving the disc 15 axially against the Belleville washer 19.

When the crests of the projections 14 and 14a are almost adjacent, the Belleville washer 19 springs inside out thus moving the disc 15 axially away from the disc 13 until the projections 14 and 14a are well clear. The disc 15 thus remains out of engagement with the disc 13 which may continue to rotate.

The disc 16 will similarly be moved clear of the disc 13 should the emergency fuel control unit 50 develop a fault which causes the connecting rod connected to the lever 18 to seize.

The discs 15 and 16 may be readily moved back into engagement with the disc 13 by moving them manually until the Belleville washers 19 and 20 spring back to their original position.

I claim:

1. A clutch device comprising a driving shaft, a driving disc rigidly secured coaxially to the driving shaft, first and second driven members which are axially aligned with, and relatively rotatable and relatively axially movable with respect to the driving disc, and first and second Belleville washers respectively arranged to urge the first and second driven members into contact with oppositely disposed surfaces of the driving disc, the contacting surfaces of the driven members and the driving disc being provided with a plurality of projections which are shaped to permit driving engagement between each driven member and the driving disc and to cause relative axial movement between either one of the driven members and the driving disc when the torque on that one of the driven members exceeds a predetermined amount, said axial movement being sufficient to turn the respective Belleville washer inside-out so as to hold that one of the driven members out of driving engagement with the driving disc.

2. A clutch device as claimed in claim 1, wherein the driving members each comprise a disc which is axially slidable, and rotatably mounted on the driving shaft.

References Cited

UNITED STATES PATENTS 2,006,913    7/1935    Conley _____ 192—52
2,728,252   12/1955    Connell _____ 192—56 XR BENJAMIN W. WYCHE III, Primary Examiner U.S. Cl. X.R.

60—39.28; 192—56, 89